US012136296B2

(12) United States Patent
Inoue et al.

(10) Patent No.: US 12,136,296 B2
(45) Date of Patent: Nov. 5, 2024

(54) PARKING LOT MANAGEMENT SYSTEM, PARKING LOT MANAGEMENT APPARATUS, PARKING LOT MANAGEMENT METHOD, AND NON-TRANSITORY COMPUTER-READABLE MEDIUM

(71) Applicant: NEC Platforms, Ltd., Kawasaki (JP)

(72) Inventors: Miho Inoue, Kanagawa (JP); Makoto Kuzukubo, Kanagawa (JP); Ryota Kagiwada, Kanagawa (JP); Tatsuyuki Yazawa, Kanagawa (JP); Yuki Kobata, Kanagawa (JP); Takahiro Minami, Kanagawa (JP)

(73) Assignee: NEC Platforms, Ltd., Kanagawa (JP)

(*) Notice: Subject to any disclaimer, the term of this patent is extended or adjusted under 35 U.S.C. 154(b) by 125 days.

(21) Appl. No.: 17/793,186

(22) PCT Filed: Dec. 25, 2020

(86) PCT No.: PCT/JP2020/048876
§ 371 (c)(1),
(2) Date: Jul. 15, 2022

(87) PCT Pub. No.: WO2021/153136
PCT Pub. Date: Aug. 5, 2021

(65) Prior Publication Data
US 2023/0058856 A1 Feb. 23, 2023

(30) Foreign Application Priority Data
Jan. 31, 2020 (JP) .............................. JP2020-014588

(51) Int. Cl.
*G06V 20/52* (2022.01)
*G06V 20/62* (2022.01)
(Continued)

(52) U.S. Cl.
CPC ............... *G07B 1/06* (2013.01); *G06V 20/52* (2022.01); *G06V 20/625* (2022.01); *G08G 1/14* (2013.01);
(Continued)

(58) Field of Classification Search
CPC ................................. G07B 1/06; G06V 20/52
See application file for complete search history.

(56) References Cited

U.S. PATENT DOCUMENTS 9,286,804 B2 * 3/2016 Fayfield ................. G08G 1/146
11,232,301 B2 * 1/2022 Cohen ...................... H04N 7/18
(Continued)

FOREIGN PATENT DOCUMENTS

| CN | 108961434 A | 12/2018 |
|----|----|----|
| JP | 2002-352286 A | 12/2002 |

(Continued)

OTHER PUBLICATIONS

International Search Report for PCT Application No. PCT/JP2020/048876, mailed on Mar. 30, 2021.
(Continued)

*Primary Examiner* — Irfan Habib

(57) ABSTRACT

A parking lot management system according to the present disclosure includes a management apparatus, an image capturing apparatus, a cart, and a display apparatus. The management apparatus acquires, and stores as parking information, a license plate number and a spot number of a parking spot from the image capturing apparatus. Then, the management apparatus acquires, from a cart terminal of the cart, information that enables specification of the parking information of a vehicle of a customer using the cart and an identification number of the cart terminal, and stores the identification number of the cart terminal in association with the parking information. Then, the management apparatus
(Continued)

detects return of the cart to a predetermined location, calculates a predicted time until the parking spot is freed up, and updates display on the display apparatus based on the predicted time.

9 Claims, 11 Drawing Sheets

(51) Int. Cl.
*G07B 1/06* (2006.01)
*G08G 1/14* (2006.01)
*H04N 7/18* (2006.01)

(52) U.S. Cl.
CPC ......... *H04N 7/181* (2013.01); *G06Q 2240/00* (2013.01)

(56) References Cited

U.S. PATENT DOCUMENTS

| | | | | |
|---|---|---|---|---|
| 11,763,410 | B1* | 9/2023 | Roy | B60W 60/001 |
| | | | | 701/117 |
| 2006/0244588 | A1* | 11/2006 | Hannah | B62B 5/0423 |
| | | | | 340/539.13 |
| 2012/0227103 | A1* | 9/2012 | Itagaki | G06F 21/31 |
| | | | | 726/16 |
| 2013/0103200 | A1* | 4/2013 | Tucker | G01C 21/206 |
| | | | | 701/1 |
| 2018/0253604 | A1* | 9/2018 | Hiramatsu | G07G 1/0072 |
| 2019/0139066 | A1* | 5/2019 | Bryan | H04W 4/029 |
| 2021/0049772 | A1* | 2/2021 | Buibas | G06Q 30/0601 |
| 2021/0090194 | A1* | 3/2021 | Li | G06Q 10/08 |
| 2021/0158430 | A1* | 5/2021 | Buibas | H04B 3/02 |
| 2022/0134547 | A1* | 5/2022 | Cristache | B25J 11/008 |
| | | | | 700/245 |
| 2023/0377460 | A1* | 11/2023 | Sivanesan | G08G 1/143 |
| 2024/0135724 | A1* | 4/2024 | Bhanushali | G06V 40/25 |

FOREIGN PATENT DOCUMENTS

| | | |
|---|---|---|
| JP | 2008-003975 A | 1/2008 |
| JP | 2012-208833 A | 10/2012 |

OTHER PUBLICATIONS

JP Office Communication for JP Application No. 2020-014588, mailed on Mar. 23, 2021 with English Translation.

* cited by examiner

PARKING LOT MANAGEMENT SYSTEM, PARKING LOT MANAGEMENT APPARATUS, PARKING LOT MANAGEMENT METHOD, AND NON-TRANSITORY COMPUTER-READABLE MEDIUM

This application is a National Stage Entry of PCT/JP2020/048876 filed on Dec. 25, 2020, which claims priority from Japanese Patent Application 2020-014588 filed on Jan. 31, 2020, the contents of all of which are incorporated herein by reference, in their entirety.

TECHNICAL FIELD

The present disclosure relates to a parking lot management system, a parking lot management apparatus, a parking lot management method, and a non-transitory computer-readable medium.

BACKGROUND ART

There are proposed various parking lot management systems for presenting, to a parking lot user, unavailable/available information regarding vehicles in a parking lot. For example, a parking lot management system uses a sensor that is installed at a parking space, and determines presence/absence of a vehicle in the parking space. Moreover, the parking lot management system presents the determination result to a parking lot user near an entrance of the parking lot. Patent Literature 1 discloses a parking lot management system that links information about a parking lot user and information about a cart. The parking lot management system according to Patent Literature 1 is capable of identifying the user of a cart by associating identification information of the parking lot user and an identification number of the cart. Furthermore, the parking lot management system according to Patent Literature 1 is capable of managing the cart by using position information of the cart.

CITATION LIST

Patent Literature

Patent Literature 1: Japanese Unexamined Patent Application Publication No. 2002-352286

SUMMARY OF INVENTION

Technical Problem

According to the system of the background art, a sensor is provided in each parking spot in a parking lot, and whether a vehicle is currently present or absent in each parking spot may be presented. However, the system of the background art is not able to present whether a vehicle is present or absent in each parking spot until an entering vehicle actually leaves the parking spot. For example, there is a case where a user is planning to remove the vehicle, as in a state where the user is moving toward his/her vehicle after shopping. That is, there is a problem that a removal schedule of a vehicle in each parking spot in a parking lot is not presented.

To solve such a problem, the present disclosure is aimed at providing a parking lot management system, a parking lot management apparatus, a parking lot management method, and a non-transitory computer-readable medium according to which a removal schedule of a vehicle in each parking spot in a parking lot may be presented.

Solution to Problem

A parking lot management system according to the present disclosure includes:
an image capturing apparatus configured to capture vehicles parked in a plurality of parking spots in a parking lot, and to acquire license plate numbers of the vehicles and spot numbers of the parking spots;
a plurality of carts that are usable by customers who are occupants of the vehicles parked in the parking spots, the plurality of carts each including a cart terminal;
a display apparatus configured to display a parking state in the parking lot; and
a management apparatus configured to communicate with the image capturing apparatus, the cart terminal, and the display apparatus,
in which the management apparatus
acquires, and stores as parking information, the license plate number and the spot number of the parking spot from the image capturing apparatus,
acquires, from the cart terminal, information that enables specification of the parking information of the vehicle of the customer using the cart and an identification number of the cart terminal, and stores the identification number of the cart terminal in association with the parking information,
detects return of the cart to a predetermined location, and calculates a predicted time until the parking spot is freed up, and
updates display on the display apparatus based on the predicted time.

A parking lot management apparatus according to the present disclosure is a parking lot management apparatus for communicating with an image capturing apparatus configured to capture vehicles parked in a plurality of parking spots in a parking lot and to acquire license plate numbers of the vehicles and spot numbers of the parking spots, cart terminals mounted on a plurality of carts that are usable by customers who are occupants of the vehicles parked in the parking spots, and a display apparatus configured to display a parking state in the parking lot,
the parking lot management apparatus being configured to:
acquire, and store as parking information, the license plate number and the spot number of the parking spot from the image capturing apparatus,
acquire, from the cart terminal, information that enables specification of the parking information of the vehicle of the customer using the cart and an identification number of the cart terminal, and store the identification number of the cart terminal in association with the parking information,
detect return of the cart to a predetermined location, and calculate a predicted time until the parking spot is freed up, and
update display on the display apparatus based on the predicted time.

A parking lot management method according to the present disclosure is a parking lot management method performed by a parking lot management system including an image capturing apparatus configured to capture vehicles parked in a plurality of parking spots in a parking lot and to acquire license plate numbers of the vehicles and spot numbers of the parking spots, cart terminals mounted on a plurality of carts that are usable by customers who are occupants of the vehicles parked in the parking spots, a display apparatus configured to display a parking state in the parking lot, and a management apparatus configured to communicate with the image capturing apparatus, the cart terminals, and the display apparatus, the method including:

the step, performed by the management apparatus, of acquiring, and storing as parking information, the license plate number and the spot number of the parking spot from the image capturing apparatus;

the step, performed by the management apparatus, of acquiring, from the cart terminal, information that enables specification of the parking information of the vehicle of the customer using the cart and an identification number of the cart terminal, and storing the identification number of the cart terminal in association with the parking information;

the step, performed by the management apparatus, of detecting return of the cart to a predetermined location, and calculating a predicted time until the parking spot is freed up; and the step, performed by the management apparatus, of updating display on the display apparatus based on the predicted time.

A non-transitory computer-readable medium according to the present disclosure stores a parking lot management program for causing a computer to perform a parking lot management method performed by a management apparatus of a parking lot management system including an image capturing apparatus configured to capture vehicles parked in a plurality of parking spots in a parking lot and to acquire license plate numbers of the vehicles and spot numbers of the parking spots, cart terminals mounted on a plurality of carts that are usable by customers who are occupants of the vehicles parked in the parking spots, a display apparatus configured to display a parking state in the parking lot, and the management apparatus configured to communicate with the image capturing apparatus, the cart terminals, and the display apparatus, the program being configured to cause the computer to perform the steps of:

acquiring, and storing as parking information, the license plate number and the spot number of the parking spot from the image capturing apparatus, acquiring, from the cart terminal, information that enables specification of the parking information of the vehicle of the customer using the cart and an identification number of the cart terminal, and storing the identification number of the cart terminal in association with the parking information, detecting return of the cart to a predetermined location, and calculating a predicted time until the parking spot is freed up, and updating display on the display apparatus based on the predicted time.

Advantageous Effects of Invention

According to the present disclosure, there may be provided a parking lot management system, a parking lot management apparatus, a parking lot management method, and a non-transitory computer-readable medium according to which a removal schedule of a vehicle in each parking spot in a parking lot may be presented.

EXAMPLE EMBODIMENT

Figure 1:
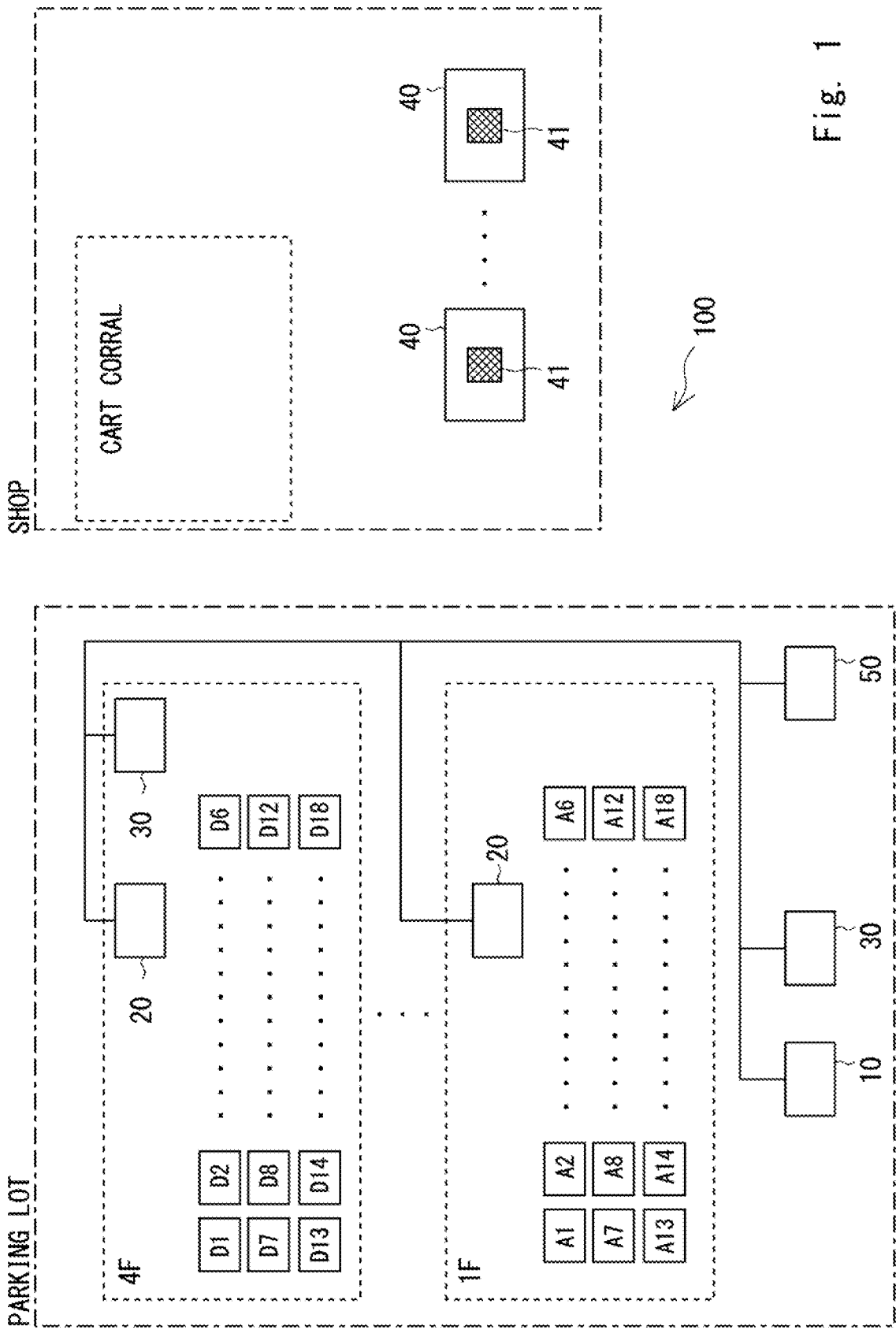
FIG. 1 is a diagram showing a configuration of a parking lot management system according to a first example embodiment.

Hereinafter, specific example embodiments to which the present disclosure is applied will be described in detail with reference to the drawings. In the drawings, same elements are denoted by a same reference sign, and overlapping description will be omitted as necessary for clarity of description.

First Example Embodiment

In the following, a first example embodiment of the present disclosure will be described.

First, a configuration of a parking lot management system 100 according to the first example embodiment will be described with reference to FIG. 1. FIG. 1 is a diagram showing the configuration of the parking lot management system according to the first example embodiment. The parking lot management system 100 includes a first image capturing apparatus 10, a second image capturing apparatus 20, a display apparatus 30, a cart 40, and a management apparatus 50. Here, an example of managing a parking lot of a shop such as a shopping center will be described. A shop is provided with the cart 40. That is, a customer comes to the shop by vehicle, and performs shopping using the cart 40. When shopping is done, the customer returns the cart 40 to a cart corral. Then, after returning the cart, the customer gets on the vehicle and goes home. Moreover, the vehicle may be any vehicle that the customer can get on, and may be a bicycle or a motorcycle, for example.

Each apparatus of the parking lot management system 100 is installed in the parking lot. One or some of the apparatuses may be installed outside the parking lot. The cart 40 is used in the shop. The parking lot where the parking lot management system 100 is installed may include a plurality of parking levels. In the present example embodiment, first to fourth levels are the parking lot. A parking space on each level of the parking lot includes parking spots (such as parking spots D1 to D18) where entering vehicles can be parked. The first level includes parking spots A1 to A18, and the fourth level includes the parking spots D1 to D18. Of course, the number of levels and the number of parking spots in a parking lot are not particularly limited.

The first image capturing apparatus 10 is installed at or near a parking lot entrance gate. The second image capturing apparatus 20 is installed at each parking spot in the parking lot. One or more display apparatuses 30 are installed at or near the parking lot entrance gate and in the parking lot. The cart 40 is used by the customer inside the shop. The management apparatus 50 is installed at or near the parking lot entrance gate. The management apparatus 50 may alternatively be installed inside the shop. The management apparatus 50 is an apparatus that controls the parking lot management system. The management apparatus 50 may be remotely operated from a remote location.

Next, an operation of the parking lot management system 100 will be described. The first image capturing apparatus 10 captures an image of an entering vehicle, and transmits the same to the management apparatus 50. The management apparatus 50 stores a license plate number as entering vehicle information. Next, the second image capturing apparatus 20 captures an image of an entering vehicle that is parked in a parking spot, and transmits the same to the management apparatus 50. The management apparatus 50 stores, as parking information, a license plate number and a spot number of the parking spot in association with each other, and updates display on the display apparatus 30 based on the parking information. When the license plate number of a vehicle is input, a cart terminal mounted on the cart 40 transmits, to the management apparatus 50, the license plate number of the vehicle that is input and an identification number of the cart terminal, and the management apparatus 50 stores the license plate number of the vehicle in the parking information and the identification number of the cart terminal of the cart 40 in association with each other. Furthermore, when detecting that the cart 40 is returned to a predetermined location, the management apparatus 50 calculates, based on the location of the parking spot where a user of the cart 40 parked and the predetermined location, a predicted time that is a time until the parking spot is freed up (the vehicle is removed), and causes the display apparatus 30 to perform display based on the predicted time.

Figure 2:
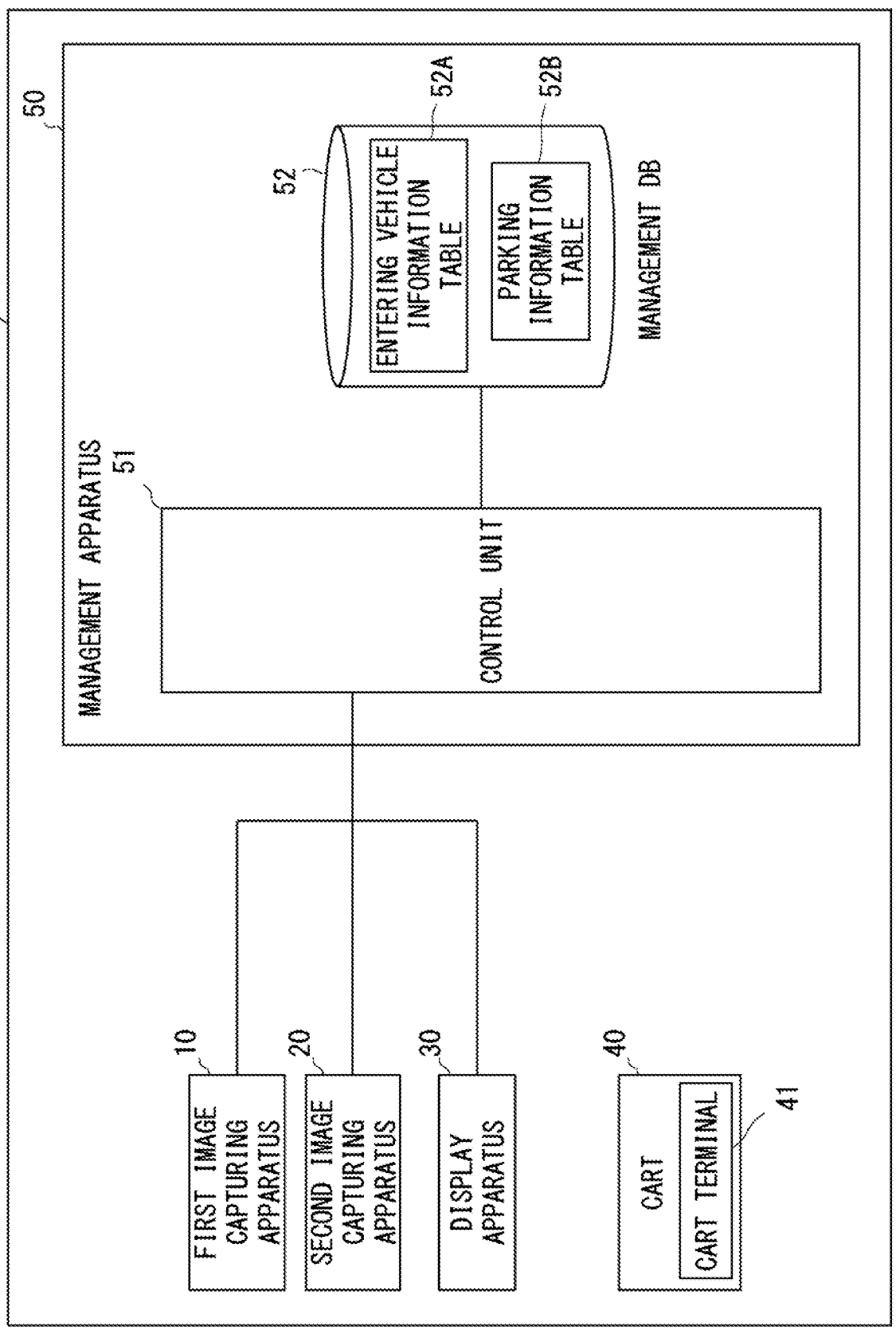
FIG. 2 is a diagram specifically showing the configuration of the parking lot management system according to the first example embodiment.

Next, a specific configuration of the parking lot management system 100 according to the first example embodiment will be described with reference to FIG. 2. FIG. 2 is a diagram specifically showing the configuration of the parking lot management system according to the first example embodiment.

The first image capturing apparatus 10 captures the license plate number of a vehicle. The first image capturing apparatus 10 captures a license plate of a vehicle at the time of the vehicle entering the parking lot or leaving the parking lot. The first image capturing apparatus 10 analyzes the license plate that is captured, and acquires the license plate number (a first license plate number). The first image capturing apparatus 10 transmits the first license plate number to the management apparatus 50. Additionally, the first image capturing apparatus 10 may transmit a captured image to the management apparatus 50. The license plate number may be acquired through image analysis by the management apparatus 50.

The second image capturing apparatus 20 determines presence or absence of a parked vehicle in a predetermined parking spot. Furthermore, the second image capturing apparatus 20 acquires the license plate number of a vehicle that is parked. Instead of determining presence or absence of a parked vehicle in the parking spot based on an image, a photoelectric sensor or the like may be installed at each parking spot and presence or absence of a vehicle in the parking spot may thereby be determined. In the case where there is no vehicle in a parking spot, a parking status of the parking spot is "available". In the case where there is a vehicle in a parking spot, the parking status is "unavailable".

The second image capturing apparatus 20 captures the license plate of a vehicle when the vehicle is parked in a predetermined parking spot. The second image capturing apparatus 20 analyzes the license plate that is captured, and acquires the license plate number (a second license plate number).

Then, the second image capturing apparatus 20 associates the spot number that is set in advance for the parking spot with the second license plate number and the parking status, and sends the same to the management apparatus 50. The parking spot and the license plate number are thereby associated with each other.

The display apparatus 30 displays, to an entering vehicle, the parking state of each parking spot. The display apparatus 30 may indicate the parking state at each parking spot using three types of display, namely, available, unavailable, and soon-to-be available. The soon-to-be available is a state which is expected to become available within the predicted time described later. Moreover, the display apparatus 30 may display, to the entering vehicle, a route to the available or soon-to-be available parking spot. The display apparatus 30 may use a liquid crystal display or the like. Alternatively, the parking state may be displayed by changing a display color of an LED installed at each parking spot. For example, the display apparatus 30 may change the display color by using green for available, red for unavailable, yellow for soon-to-be available.

The cart 40 is a movable cart that is used by the customer. For example, the cart 40 is a cart that the customer uses at the time of shopping. The cart 40 includes a cart terminal 41 that performs wireless communication with the management apparatus 50. In the present example embodiment, return of the cart 40 to a corral is detected. In the case where return of a cart is detected, the parking spot where the vehicle of the customer who used the cart 40 that is returned is parked is displayed as soon-to-be available.

The cart terminal 41 wirelessly communicates with the management apparatus 50. Each cart terminal 41 includes a cart number that is an identification number. Accordingly, the management apparatus 50 may identify the cart terminal 41 by managing the cart number at the time of wireless communication.

For example, the cart terminal 41 includes a global positioning system (GPS), and acquires its position information. The cart terminal 41 acquires the position information every specific period of time, and transmits the same to the management apparatus 50. An acquisition period or a transmission interval of the cart terminal 41 may be freely set.

The cart terminal 41 includes an input/output apparatus such as a display with a touch panel, and outputs information to a user and inputs information from the user. The cart terminal 41 includes an input function that allows a user to input a four-digit license plate number of a vehicle. Furthermore, the cart terminal 41 transmits, to the management apparatus 50, the license plate number that is input or selected, together with the cart number.

The management apparatus 50 performs communication with the first image capturing apparatus 10, the second image capturing apparatus 20, the display apparatus 30, and the cart terminal 41, and manages the entire parking lot management system 100. The management apparatus 50 includes a control unit 51 and a management DB 52. Additionally, the management apparatus 50 performs communication in a wireless or wired manner with an external appliance in a network to which the management apparatus 50 is connected. Specifically, the management apparatus 50 performs communication in a wired manner with the first image capturing apparatus 10, the second image capturing apparatus 20, and the display apparatus 30. The management apparatus 50 may alternatively perform communication with these apparatuses in a wireless manner. Furthermore, the management apparatus 50 performs communication with the cart terminal 41 in a wireless manner.

The control unit 51 of the management apparatus 50 performs communication with the first image capturing apparatus 10, the second image capturing apparatus 20, and the cart terminal 41. For example, the control unit 51 acquires information from the first image capturing apparatus 10, the second image capturing apparatus 20, and the cart terminal 41, and stores the same in an entering vehicle information table 52A and a parking information table 52B in the management DB 52. Furthermore, the control unit 51 causes the parking information acquired from the parking information table 52B in the management DB 52 to be displayed on the display apparatus 30.

The management DB 52 stores the entering vehicle information table 52A and the parking information table 52B. The entering vehicle information table 52A includes items of a parking ID, the first license plate number, an entering time, and a leaving time. The parking information table 52B includes items of the spot number, the second license plate number, the parking status, and the cart number.

Figure 3:
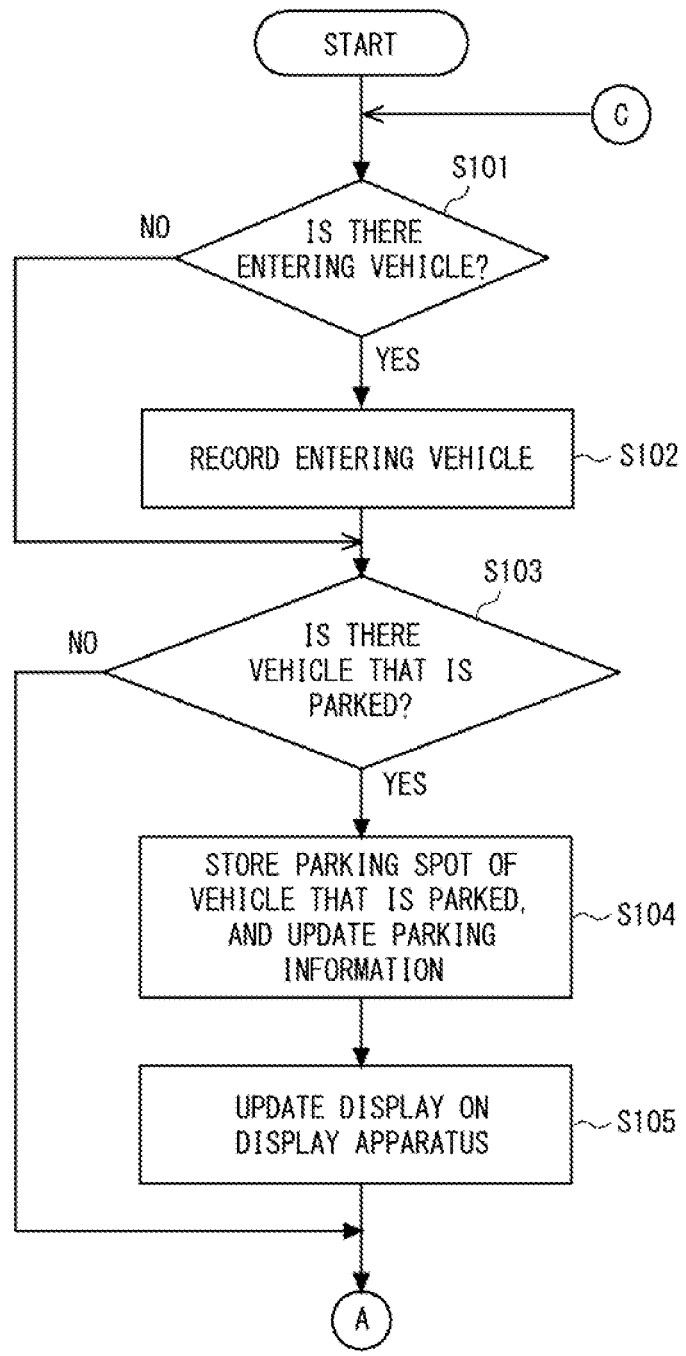
FIG. 3 is a flowchart showing an operation of the parking lot management system according to the first example embodiment.
Figure 4:
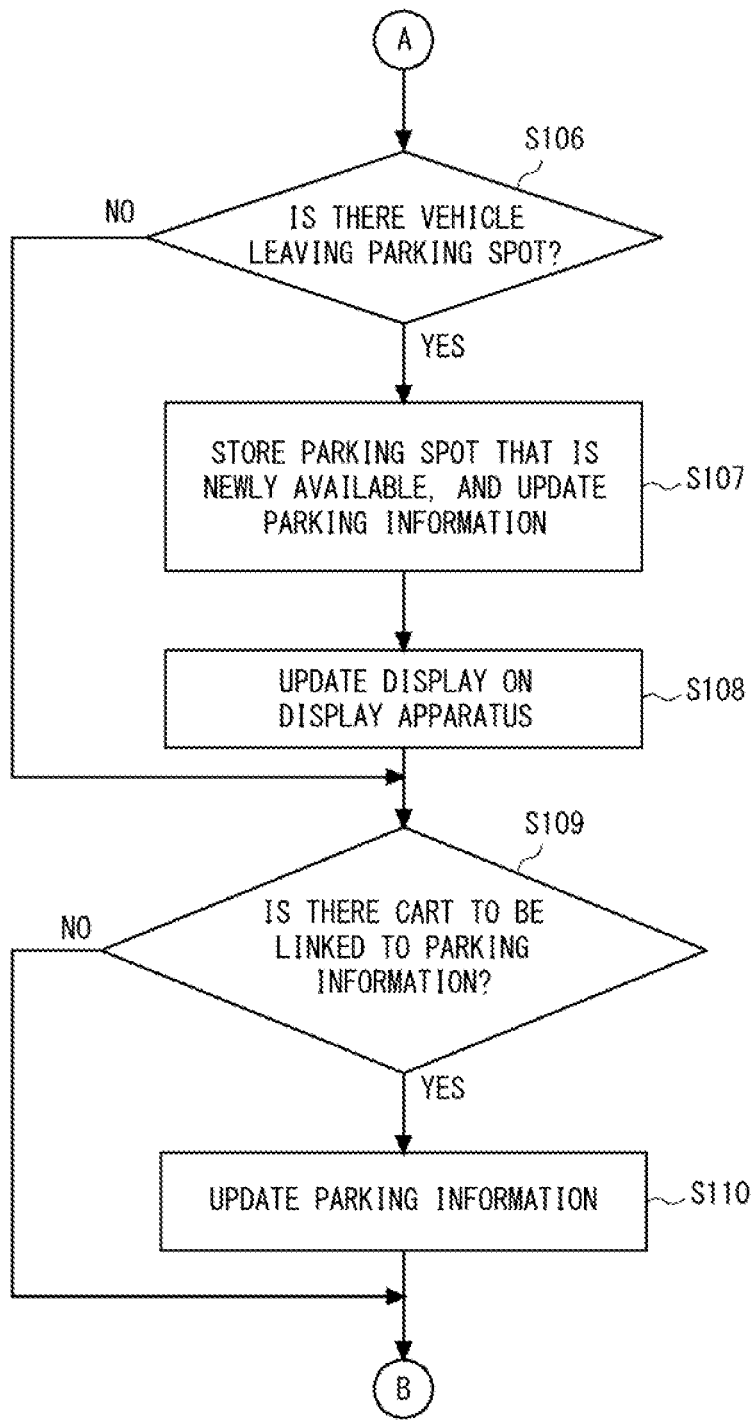
FIG. 4 is a flowchart showing the operation of the parking lot management system according to the first example embodiment.
Figure 5:
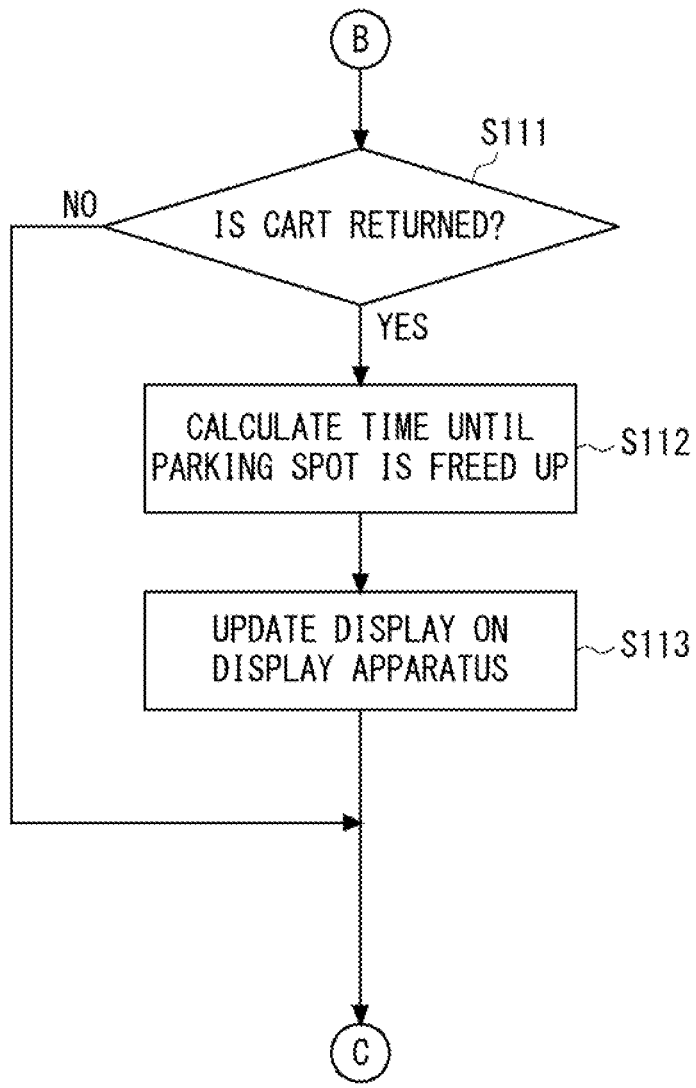
FIG. 5 is a flowchart showing the operation of the parking lot management system according to the first example embodiment.

Next, an operation of the parking lot management system 100 will be describe with reference to FIGS. 3, 4, and 5. FIGS. 3, 4, and 5 are flowcharts showing processes that are performed by the control unit 51 of the management apparatus 50.

The control unit 51 of the management apparatus 50 determines whether there is an entering vehicle in the parking lot (S101). The first image capturing apparatus 10 captures a vehicle when the vehicle enters the parking lot, and acquires the first license plate number. The first image capturing apparatus 10 transmits the first license plate number to the management apparatus 50, in association with the parking ID that is assigned when there is an entering vehicle. The control unit 51 of the management apparatus 50 temporarily stores the same. The control unit 51 of the management apparatus 50 determines presence or absence of an entering vehicle in the parking lot, and in the case of presence (S101: YES), step 102 is performed. In the case where there is no entering vehicle (S101: NO), the control unit 51 of the management apparatus 50 proceeds to step S103.

The control unit 51 of the management apparatus 50 acquires a set of the parking ID and the license plate number from the first image capturing apparatus 10, and records the parking ID and the license plate number (the first license plate number) of the entering vehicle in the entering vehicle information table 52A, and proceeds to step S103 (S102). The information from the first image capturing apparatus 10 that is temporarily stored is deleted. Additionally, the parking ID may be assigned by the control unit 51 of the management apparatus 50. At this time, the control unit 51 of the management apparatus 50 stores the entering time of the vehicle in the entering vehicle information table 52A in the management DB 52, in association with the set of the first license plate number and the parking ID. The parking ID may be a serial number according to the order of entry of vehicles, for example.

Next, the control unit 51 of the management apparatus 50 determines whether an entering vehicle is parked in a parking spot (S103). The second image capturing apparatus 20 captures a vehicle that is parked in a parking spot, and acquires the second license plate number of the vehicle. Then, the second image capturing apparatus 20 transmits the spot number that is set in advance for the parking spot to the management apparatus 50, in association with the second license plate number and the parking status "unavailable". The control unit 51 of the management apparatus 50 temporarily stores the same. The control unit 51 of the management apparatus 50 determines whether an entering vehicle is parked in a parking spot, and in the case where an entering vehicle is parked in a parking spot (S103: YES), step S104 is performed. In the case where an entering vehicle is not parked in a parking spot (S103: NO), step S106 is performed.

The control unit 51 of the management apparatus 50 updates the parking information by storing, in the parking information table 52B, the spot number of the parking spot where a vehicle is parked, the license plate number (the second license plate number), and the parking status "unavailable", and proceeds to step S105 (S104). The information from the second image capturing apparatus 20 that is temporarily stored is deleted.

The control unit 51 of the management apparatus 50 updates the display on the display apparatus 30, and proceeds to step S106 (S105). The control unit 51 of the management apparatus 50 acquires the spot number and the parking status from the parking information table 52B in the management DB 52. The control unit 51 of the management apparatus 50 causes the display apparatus 30 to display a latest parking state of the parking spot based on the pieces of information, by a display method described later.

Next, the control unit 51 of the management apparatus 50 determines whether there is a vehicle leaving a parking spot (S106). The second image capturing apparatus 20 captures a vehicle leaving a parking spot, and acquires the second license plate number of the vehicle. Then, the second image capturing apparatus 20 transmits the spot number that is set in advance for the parking spot to the management apparatus 50, in association with the second license plate number and the parking status "available". The control unit 51 of the management apparatus 50 temporarily stores the same. The control unit 51 of the management apparatus 50 determines whether there is a vehicle leaving a parking spot, and in the case where there is a vehicle leaving a parking spot (S106: YES), step S107 is performed. In the case where there is no vehicle that is leaving a parking spot (S106: NO), step S109 is performed.

The control unit 51 of the management apparatus 50 updates the parking status, in the parking information table 52B, of the parking information that matches the license plate number of the vehicle leaving a parking spot and the spot number of the parking spot, to "available", and proceeds to step S108 (S107). The information from the second image capturing apparatus 20 that is temporarily stored is deleted.

The control unit 51 of the management apparatus 50 updates the display on the display apparatus 30 based on the parking information table 52B that is updated in step S107, and proceeds to step S109 (S108). The control unit 51 of the management apparatus 50 acquires the spot number and the parking status from the parking information table 52B in the management DB 52. The control unit 51 of the management apparatus 50 causes the display apparatus 30 to display a latest parking state of the parking spot based on the pieces of information, by a display method described later.

Figure 6:
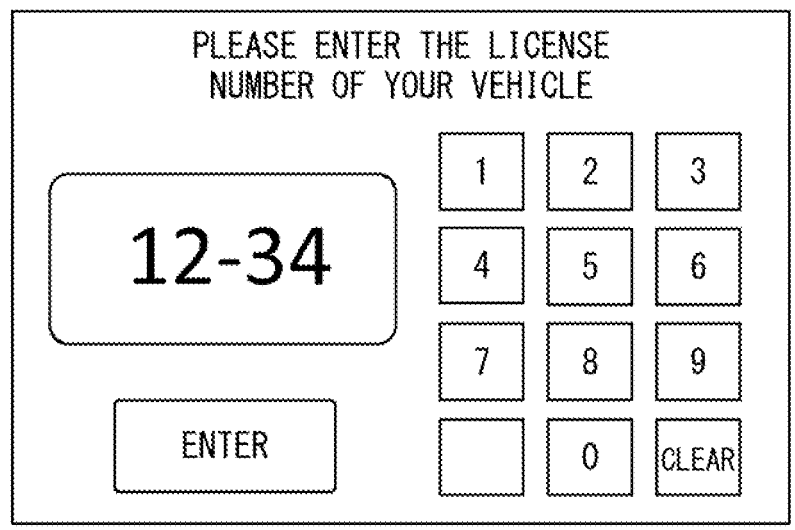
FIG. 6 is a diagram showing an example of an input screen of a cart terminal according to the first example embodiment.

The control unit 51 of the management apparatus 50 determines whether there is a cart terminal to be linked to the license plate number of a vehicle parked in the parking lot (S109). That is, whether a customer using the parking lot uses a cart is determined. As shown in FIG. 6, the cart terminal 41 of the cart 40 displays to a customer who is the user of the cart 40, a screen for inputting a four-digit license plate number. FIG. 6 is a diagram showing an example of an input screen of the cart terminal 41 according to the first example embodiment. When a four-digit license plate number is input to the cart terminal 41, the cart terminal 41 transmits, to the management apparatus 50, the four-digit license plate number that is input, together with the cart number. The control unit 51 of the management apparatus 50 temporarily stores the same. In the case where there is a cart to be linked to the license plate number of a vehicle parked in the parking lot (S109: YES), the control unit 51 of the management apparatus 50 proceeds to step S110. In the case where there is no cart that is to be linked to the parking information (S109: NO), step S111 is performed. Additionally, instead of inputting the four-digit license plate number, the spot number of the parking spot may be input to the cart terminal 41. Additionally, the license plate number and the spot number of the parking spot are pieces of information that enable specification of the parking information of a vehicle.

The control unit 51 of the management apparatus 50 stores the cart number in the parking information table 52B, in association with the parking information whose license plate number matches the license plate number received from the cart terminal 41, and proceeds to step S111 (S110). The information from the cart terminal 41 that is temporarily stored is deleted.

Next, the control unit 51 of the management apparatus 50 determines whether the cart 40 is returned (whether use is finished) (S111). Return of the cart 40 is determined in the following case, that is, a case where a button "end" displayed on the cart terminal 41 is touched. The cart terminal 41 transmits information indicating that the button "end" is touched, to the management apparatus 50. Furthermore, return of the cart 40 is also determined in the case where the control unit 51 of the management apparatus 50 detects entry of the cart 40 into a cart corral. More specifically, the control unit 51 of the management apparatus 50 detects entry of the cart 40 into a cart corral based on the position information of the GPS of the cart terminal 41 provided on the cart 40.

In the case of determining that the cart 40 is returned (S111: YES), the control unit 51 of the management apparatus 50 proceeds to step S112. In the case where return of the cart 40 is not determined (S111: NO), step S101 is performed. Next, the control unit 51 of the management apparatus 50 calculates the predicted time until the parking spot of the vehicle of the user is freed up and stores the predicted time in the parking information table 52B, and proceeds to step S113 (S112). More specifically, the control unit 51 of the management apparatus 50 calculates a time that is necessary for the user of the cart 40 to move from a return location of the cart 40 to the parking spot of the vehicle. The control unit 51 of the management apparatus 50 specifies a current position of the cart 40 from the position information of the GPS of the cart 40. The control unit 51 of the management apparatus 50 acquires the parking spot of the user of the cart 40 from the parking information table 52B in the management DB 52. The control unit 51 of the management apparatus 50 calculates the predicted time based on the current position of the cart 40 and the location of the parking spot. For example, to calculate the predicted time, a walking speed of a regular person is used, and a time necessary for a user to remove a vehicle from the parking spot (such as five minutes) is added. The control unit 51 of the management apparatus 50 stores the predicted time that is calculated, in the parking information table 52B in the management DB 52, in association with the parking information with a matching cart number.

Then, the control unit 51 of the management apparatus 50 updates the display on the display apparatus 30 based on the parking information table 52B that is updated, and proceeds to step S101 (S113). The control unit 51 of the management apparatus 50 acquires, from the parking information table 52B in the management DB 52, the spot number, the predicted time, and the parking status. The control unit 51 of the management apparatus 50 causes the display apparatus 30 to display a latest parking state of the parking spot based on the pieces of information, by a display method described later.

Figure 7:
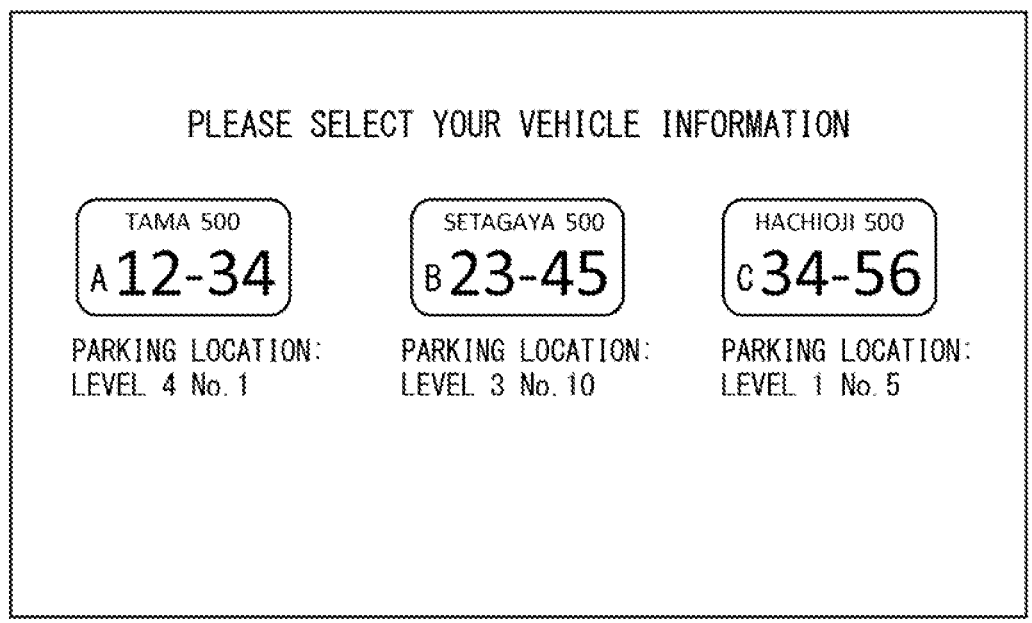
FIG. 7 is a diagram showing an example of the input screen of the cart terminal according to the first example embodiment.

In the description above, the license plate number and the cart number are associated with each other by manual input of the license plate number into the cart terminal 41 by the customer, but the license plate number and the cart may be associated with each other by other methods. For example, as shown in FIG. 7, the cart terminal 41 of the cart 40 may display a list of license plate numbers not associated with the cart terminals 41 of the carts 40, to make the user perform selection. FIG. 7 is a diagram showing an example of the input screen of the cart terminal 41 according to the first example embodiment.

The list of license plate numbers not associated with the cart terminals 41 of the carts 40 is a list of license plate numbers in the management DB 52, for example. The control unit 51 of the management apparatus 50 transmits the list of license plate numbers not associated with the cart terminals 41, to the cart terminal 41. The cart terminal 41 receives and displays the list of license plate numbers. The user selects the license plate number of his/her vehicle. When a license plate number is selected, the cart terminal 41 associates and transmits the license plate number and the cart number to the management apparatus 50.

Additionally, as shown in FIG. 7, the list of license plate numbers that is displayed on the cart terminal 41 may display the parking spots and the parking levels where vehicles of the license plate numbers are parked.

Figure 8:
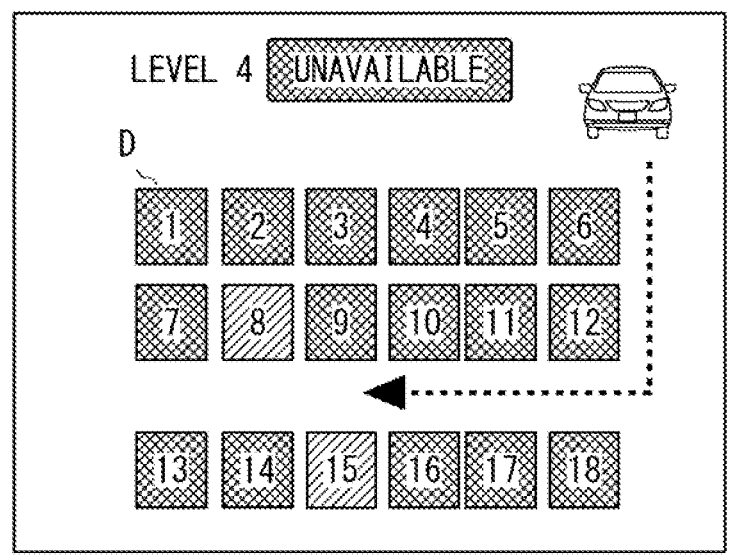
FIG. 8 is a diagram showing example display on a display apparatus according to the first example embodiment.
Figure 9:
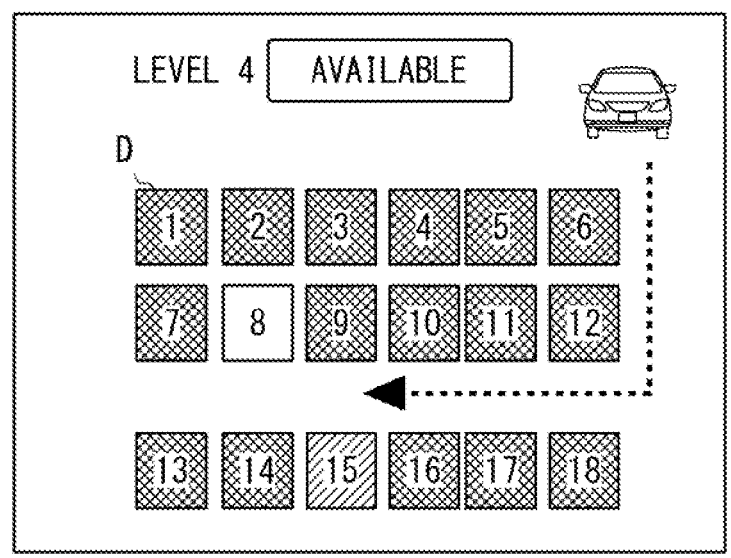
FIG. 9 is a diagram showing example display on the display apparatus according to the first example embodiment.
Figure 10:
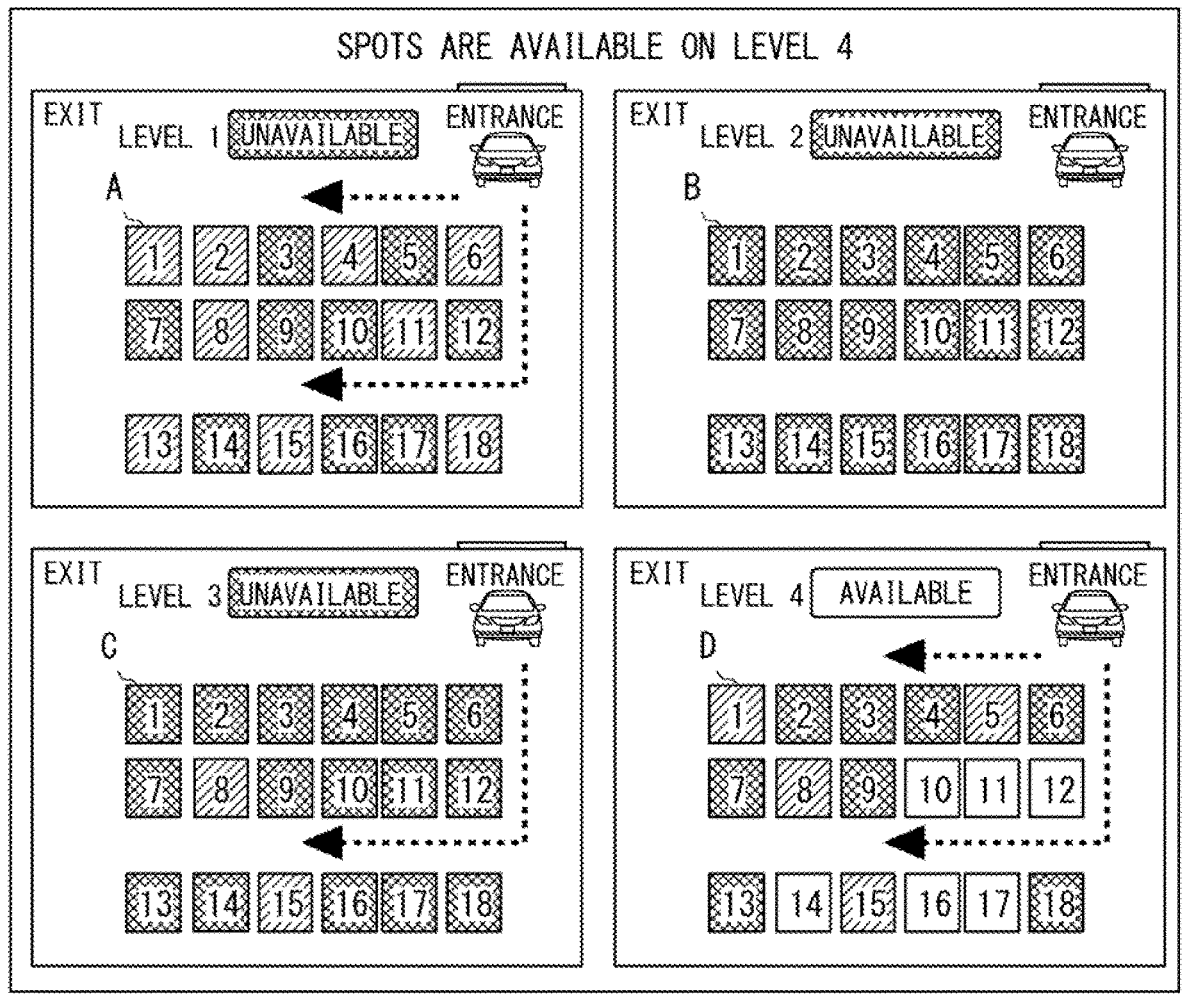
FIG. 10 is a diagram showing example display on the display apparatus according to the first example embodiment.

Next, a display method of the display apparatus 30 will be described in detail with reference to FIGS. 8, 9, and 10. FIGS. 8, 9, and 10 are diagrams showing example displays on the display apparatus 30 according to the first example embodiment.

As shown in FIGS. 8, 9, and 10, the display apparatus 30 may display the parking state at a parking spot using three types of display, namely, available, unavailable, and soon-to-be available, according to an instruction from the management apparatus 50. For example, the display apparatus 30 may display green for available, red for unavailable, and yellow for soon-to-be available. The soon-to-be available indicates that the parking spot is expected to be available within a calculated predicted time. When the predicted time is calculated by the management apparatus 50 for a parking spot where a vehicle is parked, the display apparatus 30 displays soon-to-be available as the parking state of the parking spot. Additionally, the parking spot that is soon to be available may be displayed in different colors depending on lengths of the predicted time. The colors to be displayed by the display apparatus 30 are not limited. Furthermore, the display apparatus 30 may display, to an entering vehicle, the route to the available or soon-to-be available parking spot. Moreover, the display apparatus 30 may display the predicted time calculated by the management apparatus 50, at each parking spot.

The display apparatus 30 may display soon-to-be available in two stages of orange and yellow. Orange may be used in the case where the predicted time is a specific time or longer, and yellow may be used in the case there the predicted time is shorter than the specific time. Furthermore, the color of soon-to-be available may be changed according to lapse of time. For example, the display apparatus 30 may change a display color based on an elapsed time from return of the cart and the predicted time. More specifically, in the case where the predicted time is ten minutes and the elapsed time is less than five minutes, orange may be used, and yellow may be used when five minutes is exceeded. Of course, soon-to-be available may be displayed while being classified into three or more stages. The predicted time and the elapsed time may also be displayed. Moreover, the display apparatus 30 may display a wait time based on the predicted time.

For example, as shown in FIG. 8, in the case where all the parking spots in the parking lot are unavailable, the display apparatus 30 displays the parking state to be unavailable or soon-to-be available for each parking spot. Here, the unavailable parking spot is a parking spot D1, for example. Furthermore, the parking spots that are soon to be available are a parking spot D8 and a parking spot D15. Moreover, the display apparatus 30 displays the route to the parking spot D15 that is soon to be available. As shown in FIG. 9, when a parking spot becomes available, the display apparatus 30 updates the parking state of the parking spot that is newly available to available. Here, the parking spot D8 is available.

Furthermore, as shown in FIG. 10, the display apparatus 30 may display the parking states on a plurality of levels of the parking lot at the same time. The display apparatus 30 may present, to an entering vehicle, the parking level where there is an available parking spot. In FIG. 10, the parking states of the parking spots on the first to third levels are unavailable or soon-to-be available. However, the parking spots whose parking states are available, such as a parking spot D12, exist on the fourth level. The display apparatus 30 may display such information to the user.

As described above, the parking lot management system 100 may inform the entering vehicle not only of vacant parking spots but also of parking spots that are soon to be vacant, or in other words, removal schedules of vehicles.

Second Example Embodiment

In the following, a second example embodiment of the present disclosure will be described.

Figure 11:
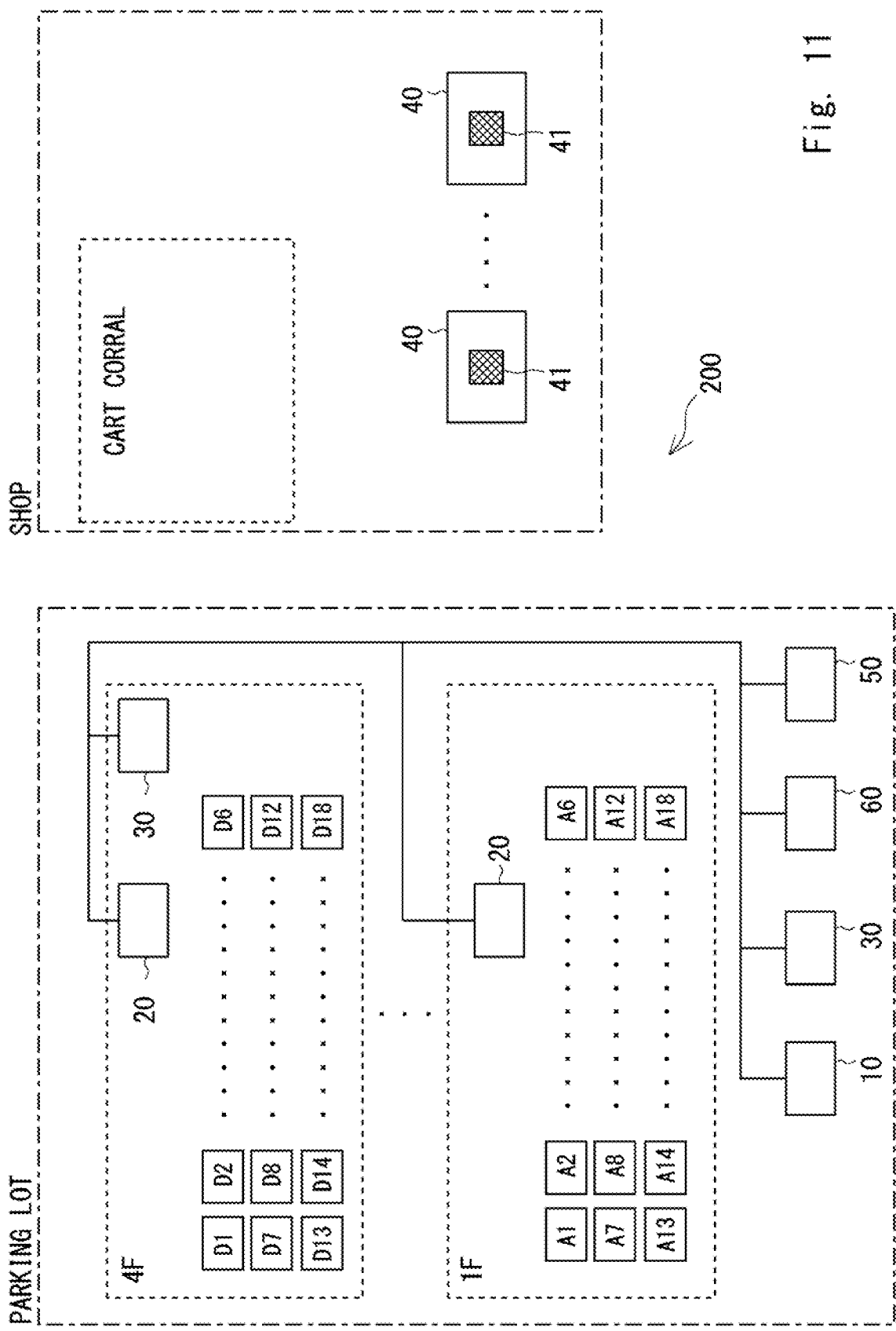
FIG. 11 is a diagram showing a configuration of a parking lot management system according to a second example embodiment.

As shown in FIG. 11, a parking lot management system 200 according to the second example embodiment includes a ticket dispenser 60, in addition to the configuration of the parking lot management system 100 according to the first example embodiment.

The ticket dispenser 60 issues a parking ticket including the parking ID. The parking ticket that is issued by the ticket dispenser 60 is a piece of paper on which a bar code or a QR code (registered trademark) is printed, for example. When a vehicle enters the parking lot or reaches a parking location, the first image capturing apparatus 10 according to the second example embodiment acquires the first license plate number of the vehicle. The first image capturing apparatus 10 sends the first license plate number to the management apparatus 50, in association with the parking ID assigned to the parking ticket. The license plate number and the parking ID, or a QR code or the like indicating the license plate number and the parking ID may be printed on the parking ticket. That is, information indicating the parking information is printed on the parking ticket. A customer who is an occupant of the vehicle carries the parking ticket issued by the ticket dispenser 60, and uses the cart 40.

Figure 12:
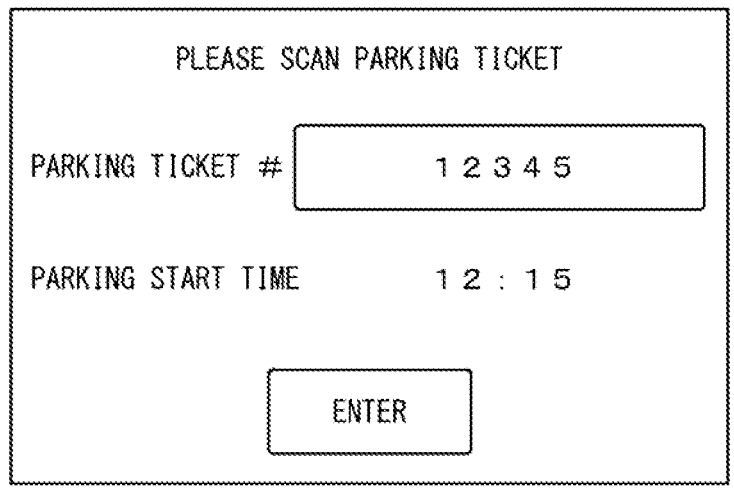
FIG. 12 is a diagram showing an example of an input screen of the cart terminal according to the second example embodiment.

The cart terminal 41 of the cart 40 according to the second example embodiment includes a function of reading the bar code or the QR code on the parking ticket. That is, the cart terminal 41 includes a scanner or a camera, and may read the bar code or the QR code on the parking ticket and read the parking ID, as shown in FIG. 12. The management apparatus 50 searches the parking information table 52B for the license plate number of the parking ID read from the entering vehicle information table 52A, and stores and links the cart number with the parking information with the same license plate number. The cart terminal 41 may display or output, by audio, a message asking the customer to scan the parking ticket. Of course, in the case where the parking ID or the license plate number is printed on the parking ticket, the cart terminal 41 may read the same. Alternatively, the cart terminal 41 may capture the parking ticket with a camera and transmit the captured image to the management apparatus 50, and the management apparatus 50 may acquire the parking ID and the license plate number from the captured image and link the parking information and the cart number. Additionally, the parking ID and the license plate number are pieces of information that enable specification of the parking information of a vehicle.

Additionally, in the first example embodiment or the second example embodiment, the cart 40 may include an IC tag, and the cart corral may be provided with an IC tag reader. In this case, the IC tag reader reads the IC tag of the cart 40, and acquires the cart number that is the identification information. Then, the IC tag reader transmits the cart number to the management apparatus 50. The management apparatus 50 may detect that the cart 40 is returned to the cart corral, by receiving the cart number. Additionally, a distance between the parking lot or each parking level of the parking lot and the cart corral is stored in the management apparatus 50. In this case, the cart terminal 41 does not have to include the GPS.

Third Example Embodiment

In the following, a third example embodiment of the present disclosure will be described.

Figure 13:
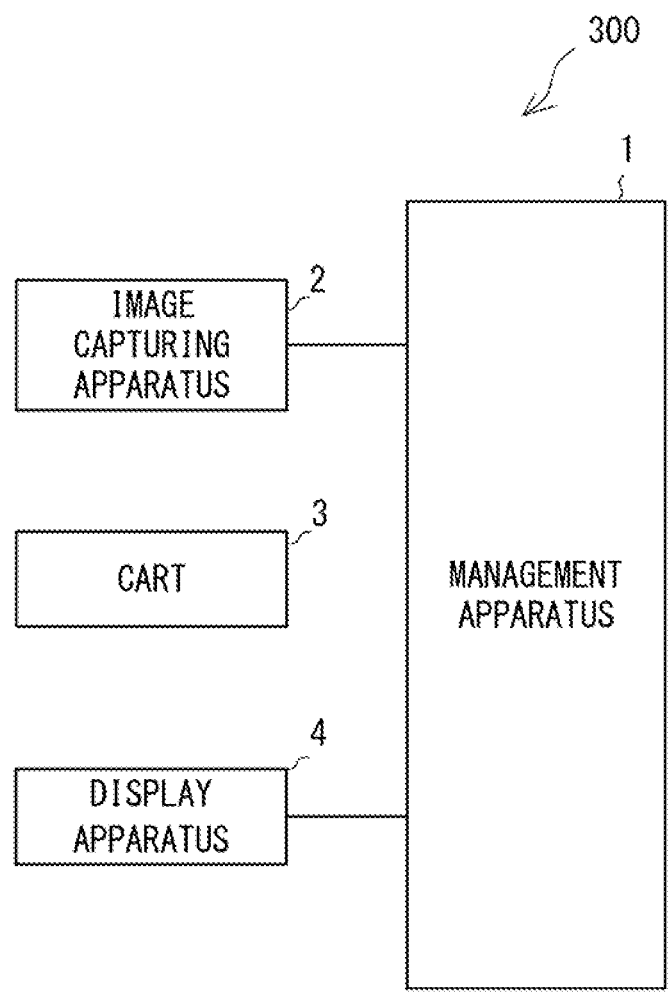
FIG. 13 is a diagram showing a configuration of a parking lot management system according to a third example embodiment.

As shown in FIG. 13, a parking lot management system 300 according to the third example embodiment has a schematic configuration of the parking lot management system 100 according to the first example embodiment and the parking lot management system 200 according to the second example embodiment. FIG. 13 is a diagram showing the configuration of the parking lot management system 300. The parking lot management system 300 includes a management apparatus 1, an image capturing apparatus 2, a cart 3, and a display apparatus 4. The management apparatus 1 performs communication with the image capturing apparatus 2, a cart terminal of the cart 3, and the display apparatus 4 described later. The image capturing apparatus 2 captures vehicles parked in a plurality of parking spots in a parking lot, and acquires the license plate numbers of the vehicles and spot numbers of the parking spots. The cart 3 includes a cart terminal, and is usable by a customer who is an occupant of a vehicle that is parked in a parking spot. Additionally, there may be a plurality of carts 3. The display apparatus 4 displays a parking state in the parking lot.

Next, an operation of the parking lot management system 300 will be described. The management apparatus 1 acquires the license plate number and the spot number of the parking spot from the image capturing apparatus 2, and stores the same as the parking information. Next, the management apparatus 1 acquires information that enables specification of the parking information of the vehicle of the customer using the cart and the identification number of the cart terminal, and stores the identification number of the cart terminal in association with the parking information. Next, the management apparatus 1 detects return of the cart 3 to a predetermined location, calculates the predicted time until the parking spot is freed up, and updates display on the display apparatus 4 based on the predicted time.

Additionally, the present disclosure is not limited to the example embodiments described above, and may be changed as appropriate within the scope of the disclosure.

Each structure in the example embodiments described above may be configured by hardware or software or by both, and may be configured by one piece of hardware or software, or by a plurality of pieces of hardware or software. The function (processing) of each apparatus may be implemented by a computer including a CPU, a memory and the like. For example, a program for performing a method of the example embodiment may be stored in a storage apparatus, and each function may be implemented through execution of the program stored in the storage apparatus by the CPU.

The programs may be stored and provided to a computer using various types of non-transitory computer-readable media. The non-transitory computer-readable media include various types of tangible storage media. Examples of the non-transitory computer-readable media include magnetic storage media (such as flexible disks, magnetic tapes, hard disk drives, etc.), optical magnetic recording media (such as magneto-optical disks), CD-ROMs (read only memories), CD-Rs, CD-R/Ws, and semiconductor memories (such as mask ROMs, PROMs (programmable ROMs), EPROMs (erasable PROMs), flash ROMs, RAMs (random access memories), etc.). Furthermore, the programs may be supplied to a computer using various types of transitory computer-readable media. Examples of the transitory computer-readable media include electric signals, optical signals, and electromagnetic waves. The transitory computer-readable media may supply the programs to a computer via wired communication lines such as an electric wire and an optical fiber, or a wireless communication line.

This application claims the benefit of priority to Japanese Patent Application No. 2020-014588, filed on Jan. 31, 2020, which is hereby incorporated by reference in its entirety.

REFERENCE SIGNS LIST

1 MANAGEMENT APPARATUS
2 IMAGE CAPTURING APPARATUS
3 CART
4 DISPLAY APPARATUS
10 FIRST IMAGE CAPTURING APPARATUS
20 SECOND IMAGE CAPTURING APPARATUS
30 DISPLAY APPARATUS
40 CART
41 CART TERMINAL
50 MANAGEMENT APPARATUS
51 CONTROL UNIT
52A ENTERING VEHICLE INFORMATION TABLE
52B PARKING INFORMATION TABLE
60 TICKET DISPENSER
100 PARKING LOT MANAGEMENT SYSTEM
200 PARKING LOT MANAGEMENT SYSTEM
300 PARKING LOT MANAGEMENT SYSTEM

What is claimed is:

1. A parking lot management system comprising:
an image capturing apparatus configured to capture vehicles parked in a plurality of parking spots in a parking lot, and to acquire license plate numbers of the vehicles and spot numbers of the parking spots;
a plurality of carts that are usable by customers who are occupants of the vehicles parked in the parking spots, the plurality of carts each including a cart terminal;
a display apparatus configured to display a parking state in the parking lot; and
a management apparatus configured to communicate with the image capturing apparatus, the cart terminal, and the display apparatus,
wherein the management apparatus
acquires, and stores as parking information, the license plate number and the spot number of the parking spot from the image capturing apparatus,
acquires, from the cart terminal, information that enables specification of the parking information of the vehicle of the customer using the cart and an identification number of the cart terminal, and stores the identification number of the cart terminal in association with the parking information,
detects return of the cart to a predetermined return location, and calculates a predicted time until the parking spot is freed up based on the predetermined return location and a location of the parking spot, and
updates display on the display apparatus based on the predicted time.

2. The parking lot management system according to claim 1, wherein
the cart terminal includes a monitor configured to display, and to allow selection of, the license plate number for storage in the parking information in association with the identification number of the cart terminal, and
the license plate number that is selected by the customer is acquired.

3. The parking lot management system according to claim 1, further comprising a ticket dispenser configured to issue a parking ticket including the information that enables specification of the parking information of the vehicle,
wherein the cart terminal reads the parking ticket and acquires the information that enables specification of the parking information.

4. The parking lot management system according to claim 1, wherein the management apparatus receives GPS information from the cart terminal, and detects return of the cart to the predetermined return location.

5. The parking lot management system according to claim 1, wherein the management apparatus receives from an IC tag reader installed at the predetermined return location, information obtained by reading information on an IC tag provided on the cart, and detects return of the cart to the predetermined return location.

6. The parking lot management system according to claim 1, wherein a plurality of the display apparatuses and a plurality of the image capturing apparatuses are installed in the parking lot.

7. The parking lot management system according to claim 1, wherein the display apparatus changes a display color corresponding to the parking spot based on the predicted time.

8. A parking lot management method performed by a parking lot management system including an image capturing apparatus configured to capture vehicles parked in a plurality of parking spots in a parking lot and to acquire license plate numbers of the vehicles and spot numbers of the parking spots, cart terminals mounted on a plurality of carts that are usable by customers who are occupants of the vehicles parked in the parking spots, a display apparatus configured to display a parking state in the parking lot, and a management apparatus configured to communicate with the image capturing apparatus, the cart terminals, and the display apparatus, the method comprising:
    acquiring, and storing as parking information, by the management apparatus, the license plate number and the spot number of the parking spot from the image capturing apparatus;
    acquiring, by the management apparatus and from the cart terminal, information that enables specification of the parking information of the vehicle of the customer using the cart and an identification number of the cart terminal;
    storing, by the management apparatus, the identification number of the cart terminal in association with the parking information;
    detecting, by the management apparatus, return of the cart to a predetermined return location;
    calculating, by the management apparatus, a predicted time until the parking spot is freed up based on the predetermined return location and a location of the parking spot; and
    updating, by the management apparatus, display on the display apparatus based on the predicted time.

9. A non-transitory computer-readable medium storing a parking lot management program executable by a management apparatus of a parking lot management system to perform a parking lot management method, the parking lot management system including an image capturing apparatus configured to capture vehicles parked in a plurality of parking spots in a parking lot and to acquire license plate numbers of the vehicles and spot numbers of the parking spots, cart terminals mounted on a plurality of carts that are usable by customers who are occupants of the vehicles parked in the parking spots, and a display apparatus configured to display a parking state in the parking lot, the management apparatus configured to communicate with the image capturing apparatus, the cart terminals, and the display apparatus, the method comprising:
    acquiring, and storing as parking information, the license plate number and the spot number of the parking spot from the image capturing apparatus,
    acquiring, from the cart terminal, information that enables specification of the parking information of the vehicle of the customer using the cart and an identification number of the cart terminal, and storing the identification number of the cart terminal in association with the parking information,
    detecting return of the cart to a predetermined return location, and calculating a predicted time until the parking spot is freed up based on the predetermined return location and a location of the parking spot, and
    updating display on the display apparatus based on the predicted time.

\* \* \* \* \*